Feb. 25, 1964  M. J. BRAUCHLE  3,122,282
FERTILIZER DISTRIBUTOR OR PLANTER
Filed Oct. 14, 1960  2 Sheets-Sheet 1

Milton J. Brauchle
INVENTOR.

BY Clarence A. O'Brien
and Harvey B. Jacobson
Attorneys

Feb. 25, 1964 M. J. BRAUCHLE 3,122,282
FERTILIZER DISTRIBUTOR OR PLANTER
Filed Oct. 14, 1960 2 Sheets-Sheet 2

Milton J. Brauchle
INVENTOR.

BY *Clarence A. O'Brien*
*and Harvey B. Jacobson*
Attorneys

United States Patent Office 3,122,282
Patented Feb. 25, 1964

3,122,282
FERTILIZER DISTRIBUTOR OR PLANTER
Milton J. Brauchle, Pleasanton, Tex.; Mildred Brauchle, administratrix of said Milton Brauchle, deceased, assignor to Universal Fertilizer Equipment Manufacturing Co., Inc., Pleasanton, Tex., a corporation of Texas
Filed Oct. 14, 1960, Ser. No. 62,657
3 Claims. (Cl. 222—368)

The present invention generally relates to a distributor for fertilizer or similar material and this application is a continuation in part of co-pending application Serial No. 766,355, filed October 9, 1958, for fertilizer distributor or planter, now abandoned.

The primary object of the present invention is to provide a novel fertilizer distributor which may be employed on a seed planter or the like and incorporating a distributor wheel disposed in such a manner that several novel results are obtained.

The construction of the distributor wheel is such that a plurality of independent pockets are formed with the partitions forming the pockets being curved in such a manner that the discharge from the pockets will be more evenly distributed over a greater arc of movement of the distributor wheel with the pockets further being arranged so that there occurs an overlapping discharge of fertilizer from three of the pockets. The distributor wheel rotates very slowly, generally on the order of from two to twenty revolutions per one hundred feet of linear movement. Also, the distributor wheel is completely free running in the fertilizer and there is no cut-off plate adjacent the pockets which cause friction and resistance to turning due to the necessity of the cut-off plate forming a closure for the pockets. The free running distributor wheel is orientated in relation to a hopper in such a manner that the fertilizer is disposed below the axis of rotation and the pockets actually move up and towards the hopper and run out of or move out of the material thus eliminating leakage past the pockets since the pockets move toward the hopper and reducing the resistance to rotation since only the lower portion of the distributor wheel adjacent the hopper is engaging the fertilizer material. The distributor wheel is more nearly balanced since there are loaded pockets on both sides of the axis of rotation. The particular construction of the distributor wheels and the manner in which they operate enables the distributor wheels to be readily constructed of inexpensive materials such as plastic or the like and the relatively slow speed of the distributor wheel enables a prolongation of the useful life thereof. Further, the distributor wheel of the present invention enables variation in the rate of discharge by varying the speed of rotation of the distributor wheel rather than by varying the size of a cut-off opening or the like thereby providing more accurate control of the discharge rate of the distributor wheel. An additional feature of the fertilizer distributor of the present invention involves the roll over distribution of the material which causes the material to spread out laterally as it rolls over the curved surface of the leading edge of the pockets as the material is being discharged thereby providing for more even lateral distribution of the material. Also, the distributor wheel may be provided with divided pockets for more even distribution on hillsides thereby maintaining an even lateral as well as longitudinal distribution rate.

It is the object of the present invention to provide a distributor wheel incorporating a structure capable of obtaining the above mentioned beneficial results and which, in addition, is quite inexpensive to manufacture, adaptable for use with various materials, easy to maintain and repair, efficient in operation, easy to control and generally long lasting and dependable.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 7 is an elevational view illustrating a partition distributor for use on a hillside or the like.

Figure 1:
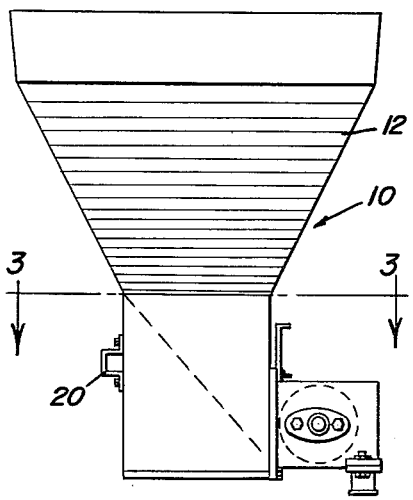
FIGURE 1 is a side elevational view of a fertilizer distributor incorporating the concepts of the present invention therein.
Figure 2:
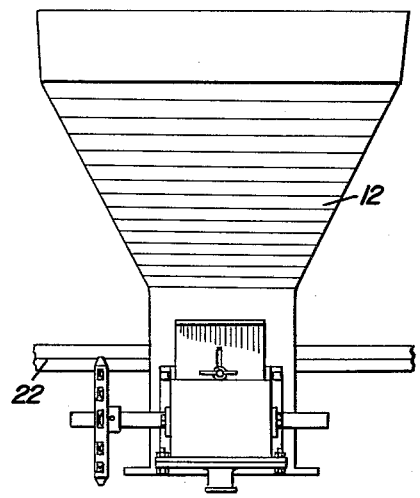
FIGURE 2 is a rear elevational view of the construction of FIGURE 1.
Figure 3:
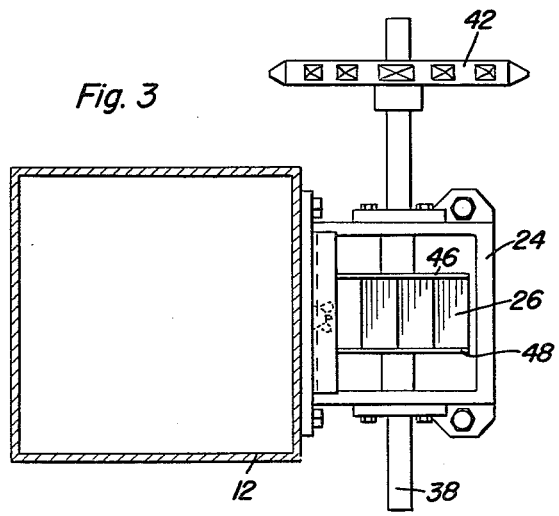
FIGURE 3 is a transverse, sectional view taken substantially upon a plane passing along section line 3—3 of FIGURE 1.
Figure 4:
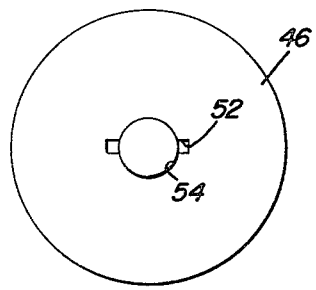
FIGURE 4 is a side elevational view of the distributor wheel illustrating the manner in which the distributor wheel is attached to the shaft for enabling driving connection between the shaft and distributor wheel.

Referring now specifically to the drawings, the numeral 10 generally designates a distributor for fertilizer, seeds or any other flowable dry material of this nature. The invention includes a supply hopper 12 of any suitable size and configuration and the hopper is provided with an inclined bottom plate 14 merging with and jointing a vertical side plate 16 at the bottom edge thereof. The vertical plate 16 is provided with an opening 18 extending upwardly from the point of juncture with the inclined bottom 14 thus providing an outlet for the material in the hopper. The hopper is also provided with mounting brackets 20 or the like for attachment to a suitable supporting bar 22 such as a conventional tool bar or supporting bar found on a seed planter or any other supporting device on a tractor or any other vehicle. The particular details of the mounting structure and the particular shape and configuration of the supply hopper may vary depending upon the individual desires. However, it is necessary that the hopper have a generally vertical wall 16 and the inclined bottom wall 14 associated with a discharge opening 18 in the vertical wall 16 in the manner illustrated in FIGURE 5.

Bolted to the lower end of the wall 16 is a housing 24 having a peripheral flange 26 secured to the wall 16 as by suitable bolts 28 or the like. The housing 24 is provided with an open wall area 30 facing the opening 18 and registered therewith and the housing 24 is also provided with a bottom 32 having an outlet opening 34 therein disposed generally remote from the open wall area 30. Depending from the opening 34 and in alignment therewith is a discharge tube or adapter 36 that may be connected to any suitable discharge planting or distributing shoe that would normally be disposed against the ground surface. The fertilizer material may be discharged from the adapter 36 in any suitable manner.

Extending transversely through the housing 24 is a supporting and driving shaft 38 journalled in nylon bearing 40 or the like and the shaft 38 has a drive sprocket gear or the like 42 on the end thereof and the sprocket gear 42 is connected through a suitable sprocket chain with any suitable drive mechanism. The drive mechanism may be powered from a ground engaging wheel or from an external source of power such as a power take-off or the like whereby the shaft 38 is connected with means for drivingly rotating the shaft 38. Any suitable mechanism may be provided for varying the speed of rotation of the shaft 38 in relation to the speed of traversal of the spreader or distributor over the ground surface.

Mounted on the shaft 38 is a distributor wheel generally designated by numeral 44. The distributor wheel 44 includes a pair of spaced circular side plates 46 and 48 which generally abut against or are disposed between the ends of the bearings 40. The side plates 46 and 48 are interconnected by a generally cylindrical hub 50 which is closely received on the shaft 38 and the side plate 48 is provided with a pair of radially extending notches or recesses 52 disposed at diametrically opposed points in relation to the hollow interior 54 of the hub 50. The notches or recess 52 receive radial projections 56 secured to the shaft 38 either by being integral therewith or being in the form of a transverse pin or key extended through the shaft 38. This drivingly connects the distributor wheel 44 to the shaft 38 for rotation therewith and also enables ready removal of the distributor wheel from the shaft 38 in the event the device is desired to be disassembled.

Figure 5:
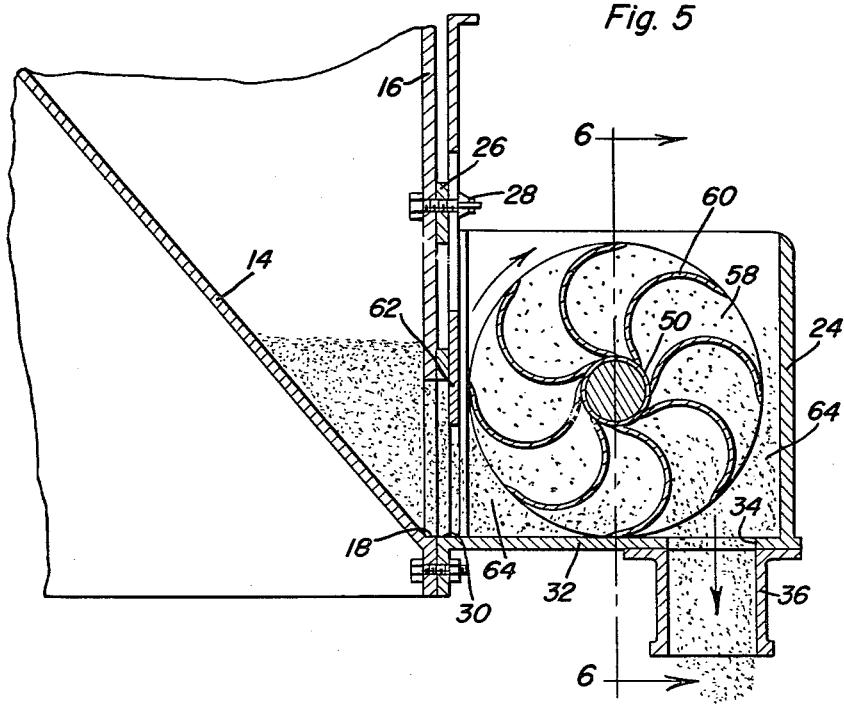
FIGURE 5 is a vertical sectional view illustrating the relationship of the distributor wheel to the hopper, the material in the hopper and the relationship of the material as it is being discharged from the distributor wheel.
Figure 6:
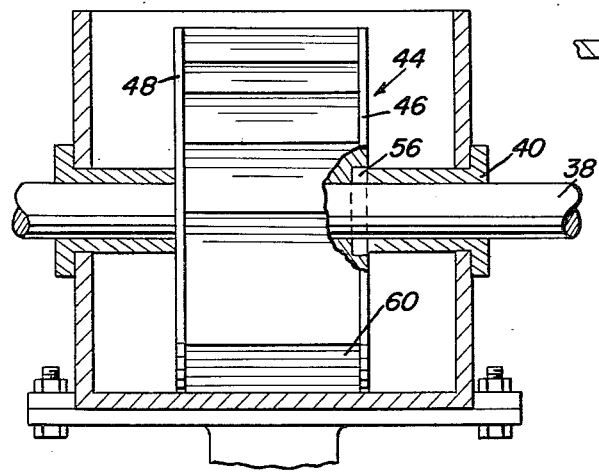
FIGURE 6 is a sectional view taken substantially upon a plane passing along section line 6—6 of FIGURE 5 but illustrating the distributor wheel in elevation except for a partial broken away portion illustrating the driving connection between the distributor wheel and shaft.

As illustrated in FIGURE 5, the distributor wheel 44 is divided into a plurality of pockets 58 by transversely extending partitions 60 which have their inner ends integral with or connected with the hub 50 and which curve somewhat in the nature of a semi-cylinder in which the inner edge is generally tangential to the hub 50 and the outer edge generally tangential with the peripheral surface or edge of the side plates 46 and 48. Also, the point of connection of the inner edge of the partition 60 is substantially in radial alignment with the point of connection between the outer edge of the partition and the side plates 46 and 48. The relationship of the center of the shaft 38, the inner edge of a partition 60 and the outer edge of the partition 60 is clearly illustrated in FIGURE 5 especially when considering the orientation of the section line 6—6 in relation thereto. The semi-cylindrical configuration of the partition or divider 60 is such that the open area faces upwardly when the fertilizer 64 is being picked up and faces downwardly toward the discharge opening 34 when on the discharge side of the axis of rotation of the shaft 38. As is illustrated in FIGURE 5, there are three pockets 58 discharging simultaneously into the discharge opening 34. The discharge from the pockets is over the convex surface of the partitions or dividers 60 which will provide a rolling or roll-over action of the fertilizer thus laterally distributing the fertilizer as it is discharged. Further, the pocket just completing the discharge has its rate of discharge decreasing whereas the second pocket in the middle of its discharge has a fairly constant discharge rate in relation to rotation of the distributor wheel whereas the third pocket 58 has just begun discharging and the rate of discharge will increase. Thus, as this overlapping procedure continues throughout the rotation of the distributor wheel, an even rate of discharge is maintained throughout the rotation of the distributor wheel. There is no surge of fertilizer such as occurs from a distributor wheel having straight radial dividers or partitions. Thus, a more even longitudinal distribution rate is obtained from the particular construction of the distributor wheel and relationship of the dividers and a more even lateral distribution is provided by the particular construction of the dividers.

As is illustrated, the size of the opening 18 is controlled in such a manner that the fertilizer will always maintain a level in the housing 24 below the axis of rotation of the shaft 38. This is accomplished by a vertical plate 62 which may be adjustable or may be permanently installed whereby the opening 18 has a lower edge disposed below the axis of rotation of the shaft 38 and due to this and the natural angle of repose of material such as fertilizer, seed or the like, the level of the material in the housing 24 will not be above the lower edge of the plate 62 thereby assuring that each pocket will be filled to substantially a horizontal level condition and then the pocket will merely lift itself out of the material or actually run out of the material during movement over top of the axis of rotation thereby providing a distributor wheel which has running movement over a major portion of the rotation thereof. As will be clearly evident in FIGURE 5, there is no cut-off plate or housing which forms a cut-off plate in which the fertilizer material is actually cut-off at the periphery of the distributor wheel which results in somewhat of a cutting action on the fertilizer and of course a considerable resistance to rotation. This reduction in the resistance to rotation enables the use of inexpensive materials, such as plastic, and also, the slow speed of the structure enables plastic to be employed and also prolongs the life of the distributor wheel and enables the use of nylon bearings which may employ a self-lubricating feature thus eliminating the need for the lubrication fitting.

Inasmuch as the pockets 58 move toward the inlet opening 18 as they leave the discharge opening 34, no leakage will occur past the distributor wheel since it is at all times tending to move the material back towards the inlet opening 18 until the pocket lifts the material upwardly and out of the material. Also, the loaded pockets are distributed on both sides of the axis of rotation thus more evenly distributing the weight of the material on both sides of the axis of rotation of the wheel and therefore the distributor wheel is more evenly balanced.

Figure 7:
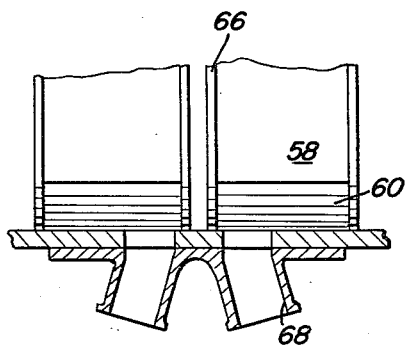

As illustrated in FIGURE 7, the distributor wheel may be provided with a peripheral partition or divider plate 66 so that a separate discharge tube 68 may be employed therewith and also the pockets 58 are divided into separate transverse areas for more even hillside distribution. This is accomplished either by the divider plate 66 or a plurality of individual partitions or dividers interconnecting the partition 60. Also, in this construction, the top of the housing 24 may be opened since there is no necessity for sealing the housing 24 and thus the operation of the distributor wheel may be observed thereby enabling the operator to readily observe when the supply of material in the hopper has been exhausted for subsequent replenishment thereof.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In a fertilizer distributor, the combination of a casing including a pair of spaced side walls, front and back walls and a bottom wall, a transverse shaft rotatably mounted in said side walls, said back wall having its lower edge disposed below the rotational axis of said shaft but spaced above said bottom wall whereby to provide an inlet opening adapted to communicate with the outlet of a hopper for delivering fertilizer therefrom into the bottom portion of the casing for filling the same to a level no higher than the axis of said shaft, a discharge chute extending downwardly from said bottom wall at a point adjacent said front wall, and a distributor wheel secured to said shaft in said casing for rotation in a direction rearwardly and upwardly from the bottom wall toward the back wall, said wheel being provided with curved pockets oriented in the direction of rotation of the wheel, whereby fertilizer and seed in the bottom portion of the casing may be picked up and conveyed by said pockets and discharged adjacent said front wall by gravity into said discharge chute, said pockets being defined by a pair of circular side plates and a plurality of transverse partitions curved with the concave surface opening in the direction of rotation whereby a plurality of pockets will be discharging at the same time from the convex side thereof thereby providing a more even spread for the fertilizer, the outer end edges of said partitions being tangential to the periphery of the side plates and the inner end edges being tangential to said shaft, the ends of the edges of said partitions being in substantial radial alignment with the center of rotation of the shaft, the major portion of the distributor wheel having the major portion thereof completely free and out of the fertilizer thereby reducing the resistance to rotation normally caused by fertilizer and cut-off plates associated closely adjacent to a distributor wheel, the convex surfaces of the partitions forming a curved surface for the material being discharged to roll over thereby laterally spreading the material for providing a more even lateral distribution of the fertilizer, said shaft being provided with removable bearings in the side wall for enabling replacement of the bearings and removal of the shaft, one of said side plates of the distributor wheel having radial notches therein, and projections rigid with the shaft engaging the notches for drivingly connecting the shaft to the distributor wheel.

2. The combination of claim 1 wherein said distributor wheel includes peripherally extending partitions for maintaining the material spread laterally for more even distribution on hillsides.

3. The structure as defined in claim 2 wherein said distributor wheel is constructed of one-piece plastic material and delivers a predetermined quantity of fertilizer for each revolution whereby the quantity of fertilizer may be varied by varying the speed of rotation of the distributor wheel.

References Cited in the file of this patent
UNITED STATES PATENTS

| | | |
|---|---|---|
| 1,437,863 | Raymond | Dec. 5, 1922 |
| 2,824,675 | Pepitone et al. | Feb. 25, 1958 |

FOREIGN PATENTS

| | | |
|---|---|---|
| 254,520 | Germany | Dec. 9, 1912 |
| 563,865 | Germany | Dec. 5, 1932 |